July 15, 1941. W. W. SAYERS ET AL 2,249,049
SCUM SKIMMER
Filed Dec. 24, 1938 5 Sheets-Sheet 1
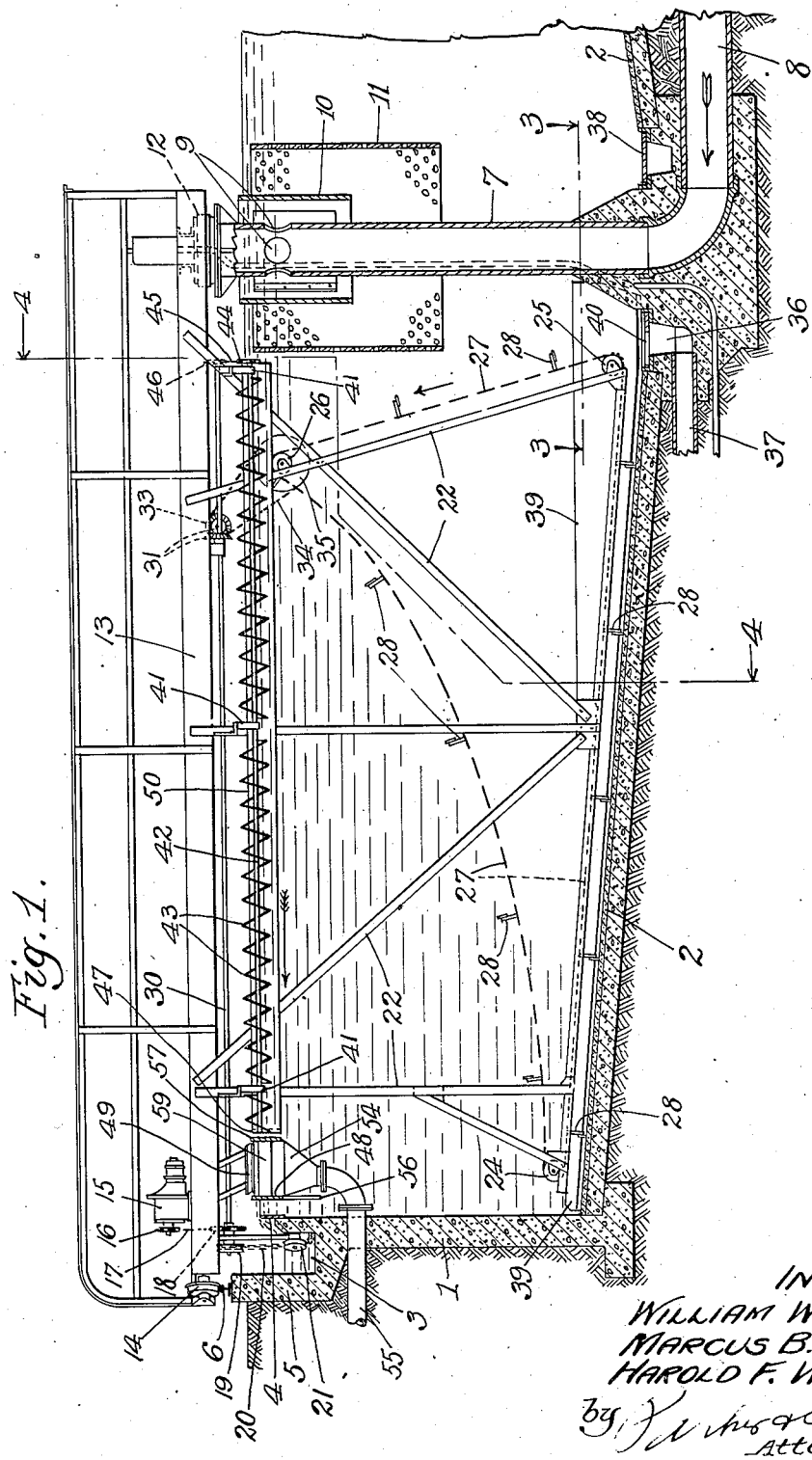
Fig. 1.
INVENTORS:
WILLIAM W. SAYERS,
MARCUS B. TARK, AND
HAROLD F. WATSON

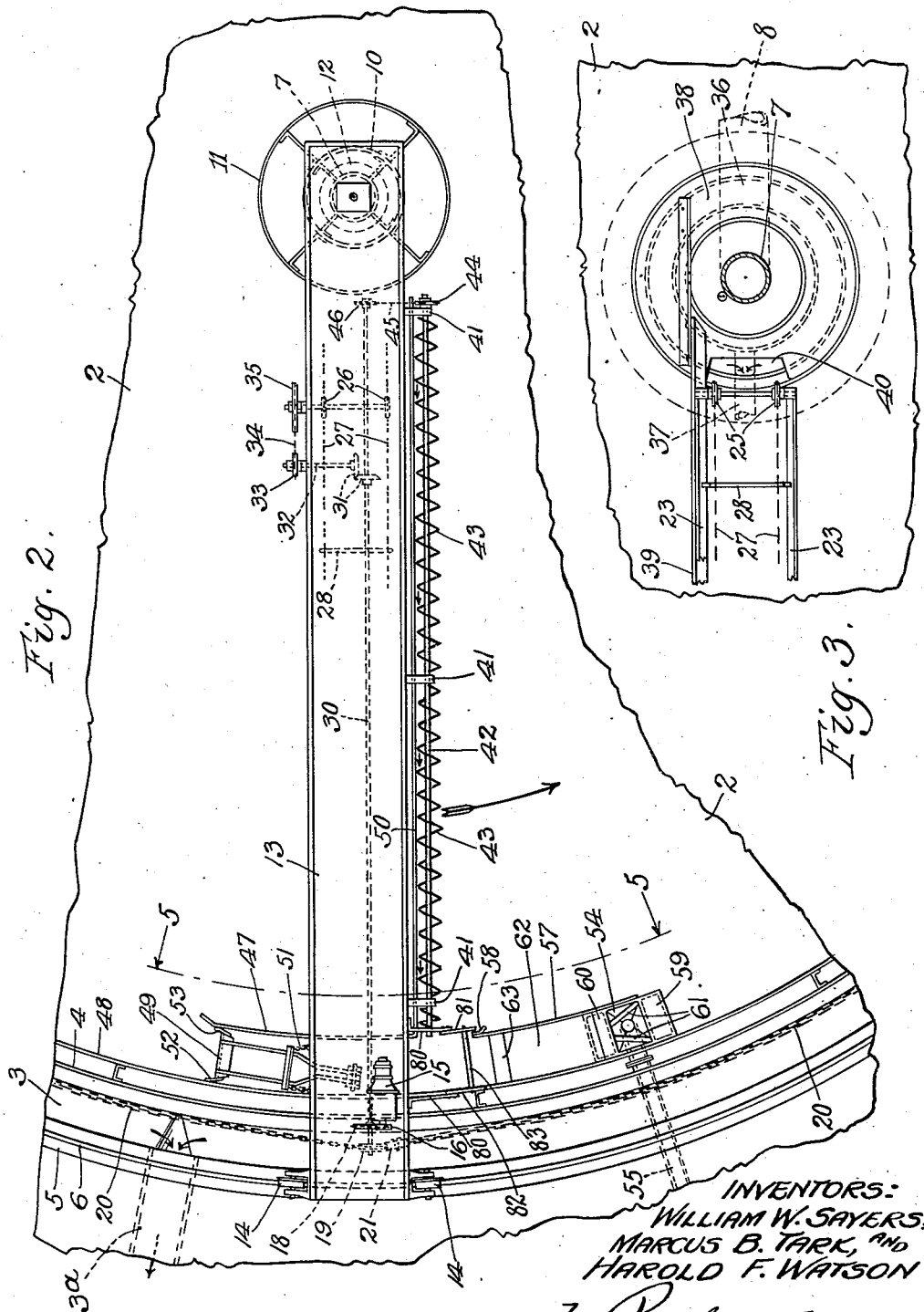

July 15, 1941.　　W. W. SAYERS ET AL　　2,249,049
SCUM SKIMMER
Filed Dec. 24, 1938　　5 Sheets-Sheet 4

INVENTORS:
WILLIAM W. SAYERS,
MARCUS B. TARK, AND
HAROLD F. WATSON
by Parker & Carter
Attorneys.

July 15, 1941.  W. W. SAYERS ET AL  2,249,049

SCUM SKIMMER

Filed Dec. 24, 1938  5 Sheets-Sheet 5

INVENTORS:
WILLIAM W. SAYERS,
MARCUS B. TARK, AND
HAROLD F. WATSON by Parker & Carter
Attorneys.

UNITED STATES PATENT OFFICE 2,249,049

SCUM SKIMMER

William W. Sayers, Chicago, Ill., and Marcus B. Tark and Harold F. Watson, Philadelphia, Pa., assignors to Link-Belt Company, Chicago, Ill., a corporation of Illinois Application December 24, 1938, Serial No. 247,674

13 Claims. (Cl. 210—3)

Our invention relates to improvements in sedimentation apparatus and the like and has for one object to provide a scum skimmer which is especially applicable to circular tanks, though it may also be used in connection with tanks of square or rectangular areas.

Among the objects of our invention are: To provide a scum skimmer which is independent in so far as its rate of scum transmission is concerned, of the sludge collector which is used in connection with the sedimentation tank.

To provide a scum skimmer whose action will be sufficiently rapid and positive to prevent wind blowing the collected scum away from the collector and so interfering with its action.

To provide a scum skimmer which may discharge its scum according to the design of the apparatus equally well at the periphery or adjacent the center of a sedimentation tank.

To provide a scum skimmer which will be of maximum efficiency especially in so far as the discharge of collected scum to the scum trap or discharge hopper is concerned.

To provide a scum skimmer wherein means are available to automatically wash and flush the scum discharge system while at the same time maintaining the amount of waste water at a minimum.

Other objects will appear from time to time throughout the specification and claims.

Our invention is intended for use in connection with sedimentation tanks for sewage and the like and particularly in connection with circular or square tanks wherein a collecting member rotates about a center of rotation inside the tank.

A circular or square tank with a collector of the type above referred to presents problems not found in connection with rectangular tanks where the collecting member extends the width of the tank and moves from end to end thereof. These tanks are very large, sometimes several hundred feet in diameter, and are exposed in open places and the surface is subjected to the prevailing winds. The scum which rises to the surface and which must be collected is light and floats easily under the influence of the wind. As the scum collector rotates round and round about its center of rotation, during part of its movement it will be propelling the scum into the wind, during another part it will be propelling the scum away from the wind. There is no difficulty as long as the scum collector is moving against the wind but especially when traveling with the wind as the rate at which the scum is propelled is low, the wind will sometimes blow the collected scum away from the collector and so the scum may escape from the zone of influence of the collector and spread over the surface of the liquid. Our invention is intended to obviate such a difficulty.

In the form of scum and sludge collector disclosed in Patent No. 2,064,497, a bridge is mounted for rotation about a pivot at the center of the tank. An endless chain flight conveyor is supported on the bridge. The bottom run collects settled sludge and discharges it to a sludge hopper at the bottom of the tank. The upper run collects the scum and moves it to a discharge at the periphery of the tank or adjacent the center thereof.

The rotary movement of the bridge must be very slow as otherwise the parts depending from it into the liquid in the tank will agitate the liquid and prevent sedimentation. The same is true of the rate of travel of the flight conveyor.

The rate of speed at which the flight conveyor must travel radially in order to prevent agitation may be much lower than the permissible rate of speed of travel of the scum collector and so we propose to provide a separate scum collecting means of improved and different type from that commonly used in the past, which is carried by the bridge and adapted to move the scum radially at a higher speed than that of the flight conveyor. By doing this, the scum will be collected and discharged at a sufficiently rapid rate so that the scum is collected and trapped in a scum retaining pocket while the bridge travels against or with the wind and discharged from the system as the bridge and scum retaining pocket passes the scum discharge hopper.

Our screw conveyor is partially immersed in the liquid, only a part of each flight contacts the scum at one time, and it is provided with a back board immediately behind it, the upper edge of which is above and the bottom edge of which is below the level of the liquid. Since only a part of the scum screw collector is immersed it may rotate at a relatively high rate of speed without objectionable agitation of the liquid and the conveying of the scum will be accomplished satisfactorily whether the bridge is traveling toward or away from the prevailing direction of the wind, the screw action preventing any release of the scum even though wind velocities in a direction away from the screw are high.

One of the serious problems in connection with collecting and discharging scum is when flight conveyors are used the flights must turn down in their path before they reach the scum troughs so that gap is left where the conveyor no longer controls the scum. Another difficulty is that when scraper conveyors of the type having one or more blades moving toward a scum hopper up the ramp are used, much of the scum flows back around the end of the blade or beneath the blade as it approaches the ramp and so is returned into the liquid.

Another difficulty is that when flight conveyors are used, the flights must turn down in their path before they reach the scum trough so a gap is left where the conveyor no longer controls the scum. By using a traveling screw conveyor it becomes possible to provide a scum chamber at the end thereof so that the conveyor will constantly discharge the scum into the chamber approximately in line with the scum trough and discharge hopper.

We propose to avoid the flow of the liquid and solids around or beneath the blade of the scraper, serving the trapped scum chamber, which moves the collected scum up the incline to the scum hopper, by providing a relatively long scum trough leading to the hopper and giving this trough a floor which will extend a considerable distance in front of the discharge hopper. A blade and pivoted scraper forming a storage chamber carried by the bridge or support rearwardly adjacent the end of the screw conveyor propels and floats the trapped scum forwardly into this long scum trough but before any appreciable amount of the scum starts to be forced into the trough, the scum scraper will have filled the space between the floor and walls of the trough, thereby trapping a certain amount of water with the scum. The pivoted traveling scraper closing the space between the fixed blade and the fixed baffle, pushes the trapped water and the scum forwardly forcing it up the ramp of the trough leading to the hopper in which both the scum and water are discharged. Thus there is automatically forced into the scum hopper with the scum some water which washes and floats the scum previously trapped in the scum chamber into and along the scum trough and thence into the scum hopper where it is discharged. The water which is associated with the scum aids in washing the collected scum along the floor of the scum trough and through the hopper into the discharge pipe, whence the water assists the discharge of the scum.

Our spiral screw scum collector prevents the wind from blowing the scum away from the baffle adjacent the conveyor when the bridge is moving away from the wind because as soon as it has been subjected to the influence of the screw conveyor, the screw conveyor conveys at the necessary rate along a path parallel with the axis of the screw gathering it into the space between the screw and the backboard so that once the scum has been taken over by the screw the chances of its getting away are much less than in the case where the scum is moved forward by the flights of a conveyor at right angles to the bridge because such flights unlike the screw, offer no resistance to lateral release of the scum collected between them and in front of the backboard. The result of this improved type of scum collecting and removing apparatus is that the tank may be thoroughly cleaned of scum and after one or more complete cleaning excursions of the screw, little if any scum will remain floating on the surface of the liquid therein.

Our invention is illustrated more or less diagrammatically in the accompanying drawings, wherein—

Figure 1 is a section with parts in side elevation;

Figure 2 is a plan view;

Figure 3 is a section along the line 3—3 of Figure 1;

Like parts are indicated by like characters throughout the specification and drawings.

Figure 4:
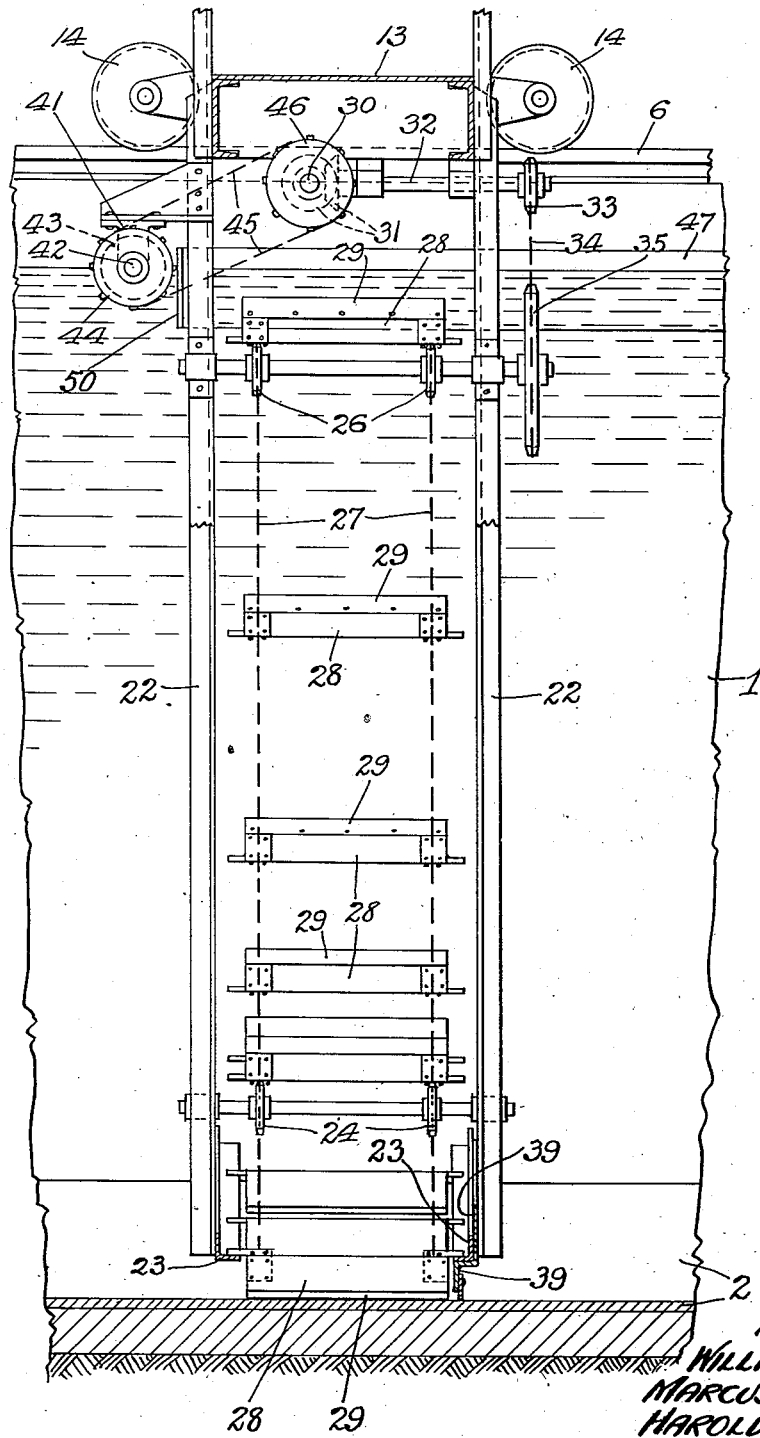
Figure 4 is a section along the line 4—4 of Figure 1.

A circular sedimentation tank has a wall 1, with a floor 2, which may if preferred be slightly inclined downwardly toward the center. 3, is an effluent channel encircling the tank having the effluent pipe 3a, and bounded on one side by the effluent weir 4, and on the other side the offset 5.

6, is a track on the offset 5. 7, is a hollow central column projecting upwardly from the floor of the tank in communication with an influent pipe 8, and apertured for discharge of the liquid to be treated at 9. 10, is a deflector plate carried by the column 7, extending above the liquid level as fixed by the weir 4, and masking the influent ports 9. 11, is a perforate baffle plate encircling the column to distribute the flow of liquid into the tank.

12, is a ball bearing turntable at the upper end of the column 7. 13, is a rotating bridge or movable support carried at one end on the turntable 12, and at the other end on wheels 14, adapted to travel along the track 6. 15, is a motorized speed reducer on the bridge. It drives by means of sprockets 16, chains 17, and sprocket 18, a traction sprocket 19. 20, is a tow chain. It is endless and lies in the channel 3. This chain comes up over an idler sprocket 21, then over the drive sprocket 19, and then is allowed to drop back into the channel 3, so that when the motorized speed reducer is operated it pulls on the chain and causes the outer end of the bridge to travel along the track.

Depending downwardly from the bridge 13, is a frame 22, supporting track angles 23, idler sprockets 24, and 25, and a drive sprocket 26. 27, is a flight conveyor having flights 28, adapted to travel over the sprockets 24, 25 and 26, the flights traveling along the track 23, so that they depend downwardly toward the floor of the tank, being equipped if desired, with squeegee blades 29. 30, is a drive shaft driven by the motorized speed reducer and it drives through meshing miter pinions 31, shaft 32, sprocket 33, chain 34, and sprocket 35, the drive sprocket 26, so that whenever the bridge is rotated about its pivot, the flight conveyor will be operated to cause the sludge collecting blades 28, to move inwardly along the floor of the tank to collect the settled sludge and convey it to the center of the tank and there discharge it into the sludge hopper 36.

The sludge hopper 36, is preferably though not necessarily annular, encircles the column 7, and discharges through a sludge pipe 37. It has an annular rotating cover 38, apertured at 40. 39, is a radial sludge plow on the frame 22, 23 behind the sludge conveyor to prevent escape of sludge from between the conveyor blades as they are moved forwardly into the sludge blanket by the forward movement of the bridge. The plow 39, is rotated in unison with the cover 38, whereby the opening 40, is kept always in line with the sludge conveyor flights.

Supported on the bridge 13, by a plurality of bearings 41, is a screw conveyor shaft 42, wound about which is a substantially continuous scum collecting screw flight 43, extending from a point adjacent the perforate baffle 11, out to a point inside the outer periphery of the tank. This screw 43, is driven by a sprocket 44, chain 45, and sprocket 46, from the drive shaft 30 so that the screw also rotates only when the bridge is being moved about the tank.

Carried by the bridge 13, is a movable scum chamber which includes a blade 47, concentric with the weir 4. 48, is a scum baffle mounted inside the weir and extending from a point above the liquid level to a point below the level of the weir. It is fixed in position and is concentric with the blade 47. The blade 47, is near the end of the scum collecting screw 43, 49 is a hinged scum scraper supported on the bridge or movable support 13, and adapted to close the space between the blade 47, and the baffle 48. This arrangement defines a movable scum chamber extending rearwardly from the discharge end of the scum collecting screw so that as the bridge rotates, scum is moved toward the outer periphery of the tank by the screw and passes into the scum chamber. 50, is a backboard back of the screw 43, to prevent escape of scum back of the screw as the screw is moved forward in the direction of the arrows shown on Figure 2. A chain 51, limits the downward movement of the scum scraper 49.

The scum scraper is provided with flexible squeegees 52, 53, engaging respectively the scum baffle 48, and the scum chamber blade 47, to prevent escape of the scum toward the rear. 54 is a scum hopper mounted on the wall of the tank and discharging through the scum pipe 55. Adjacent the scum hopper, the scum baffle 48 is increased in depth as indicated at 56. Extending forwardly toward the bridge as it approaches the scum hopper, is a fixed curved blade 57. It is so positioned that as the bridge approaches and passes over the scum hopper 54, the blade 47 will be just outside the blade 57. The squeegee 58, on the blade 57, engages the blade 47, to make a tight joint. On both sides of the scum hopper are ramps 59, 60. The ramp 59 is provided for the purpose of easing the scum plow back into the water after it has passed over the scum hopper. 61 is a track over the scum hopper to prevent the scum plow from dropping into it. Located between the baffle 56, and the baffle 57, and in front of the ramp 60, is a floor 62, below the liquid level. This floor terminates in a downwardly inclined ramp 63, within the channel defined between the blade 57, and the scum baffle 56, to form a scum trough which discharges into the hopper 54.

As the bridge approaches the scum trough, it carries with it the scum in the movable scum chamber. When the blades 57, and 47, are in register, no further scum will be admitted to the chamber. The scum screw will continue to pile up scum against the outside of the blade 57. The scum in the scum chamber will be moved forward along the scum trough toward the scum hopper. As the scum chamber approaches the scum hopper, some of the liquid therein will escape into the tank until the scum plow 49 engages the ramp 63, at the end of the scum trough, the scum meanwhile floating on the surface and not being returned to the tank. Thereafter only a portion of the liquid may escape from the scum chamber and as the scum scraper moves forwardly, it will scrape the entrapped water and the scum along the floor 62, thence up the ramp 60, and discharge the trapped scum with water into the scum hopper.

If the floor 62, and ramp 63, were to be omitted and if the scum plow merely scraped the scum up the relatively sharp ramp 60, some of the scum would be forced down beneath the scum plow and beneath the ramp and be liberated in the tank whereas by entrapping the water and scum before it is raised over the ramp 60, above the liquid level for discharge into the hopper, such escape of scum is prevented and some water is automatically forced into the scum system on every revolution of the bridge to wash the scum out of the hopper down through the scum pipe.

Figure 8:
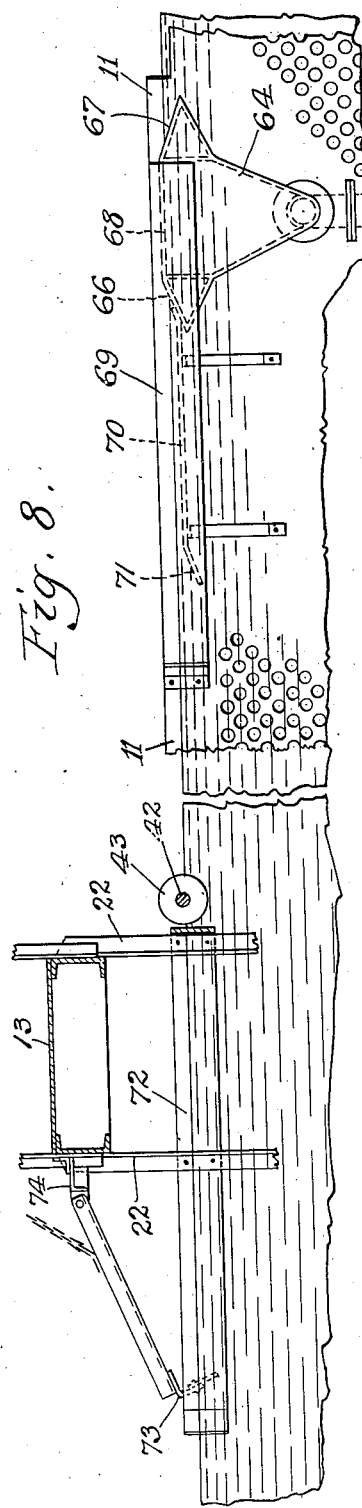
Figure 8 is a part section along the line 8—8 of Figure 6.
Figure 5:
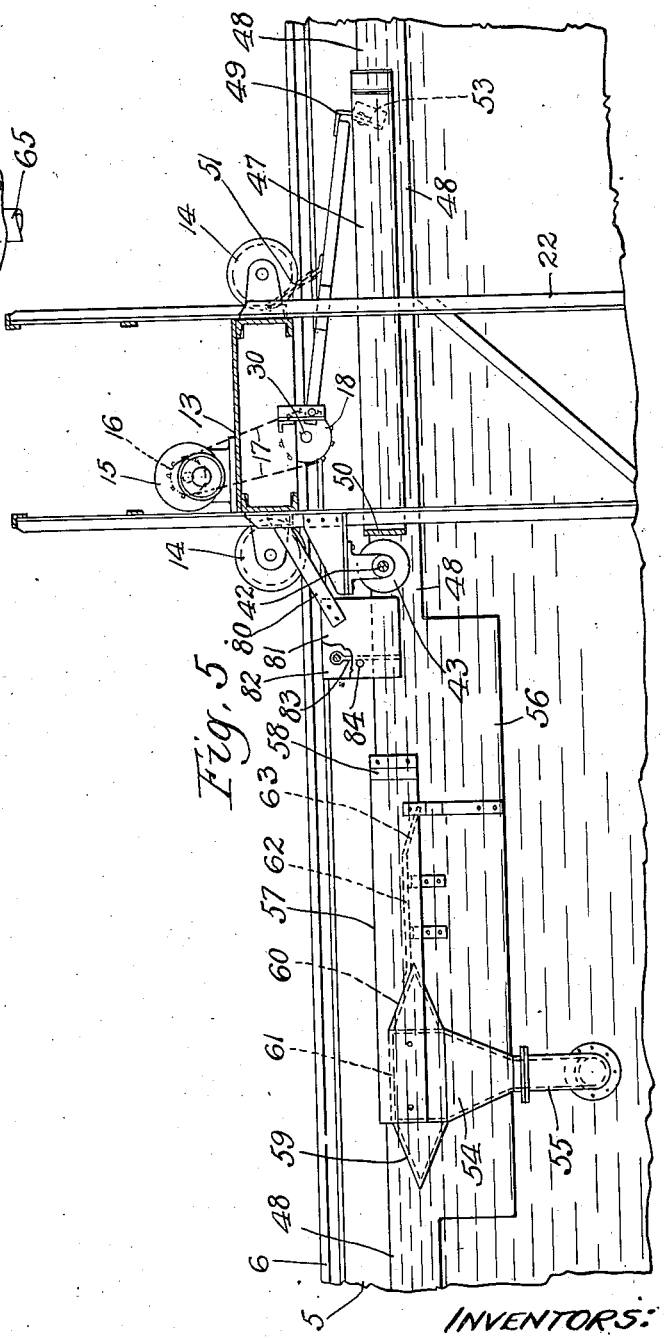
Figure 5 is a part section along the line 5—5 of Figure 2.
Figure 7:
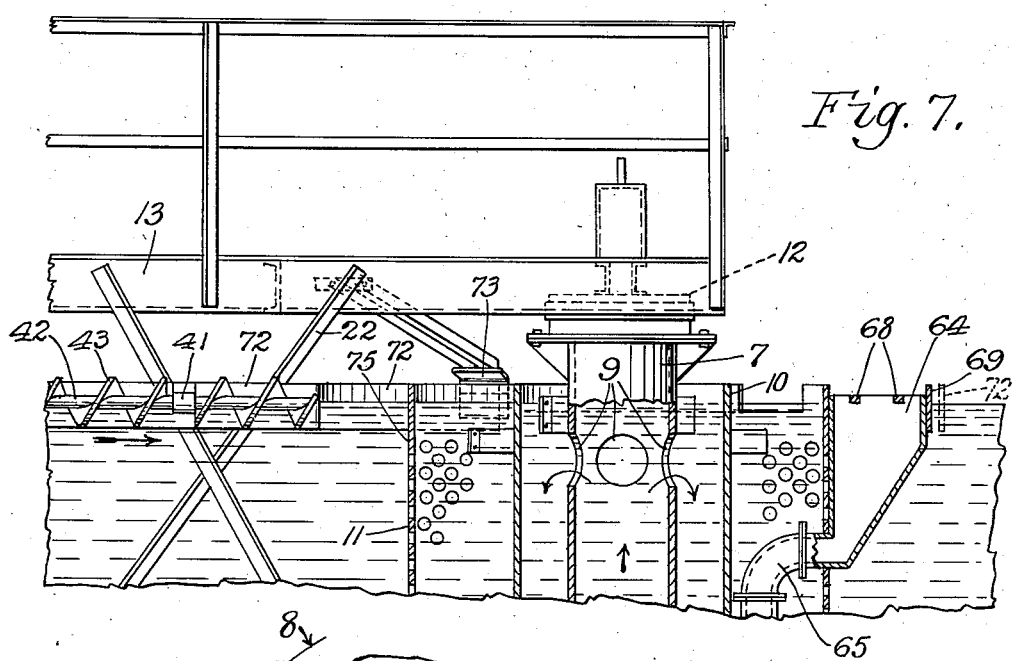
Figure 7 is a part section along the line 7—7 of Figure 6.
Figure 6:
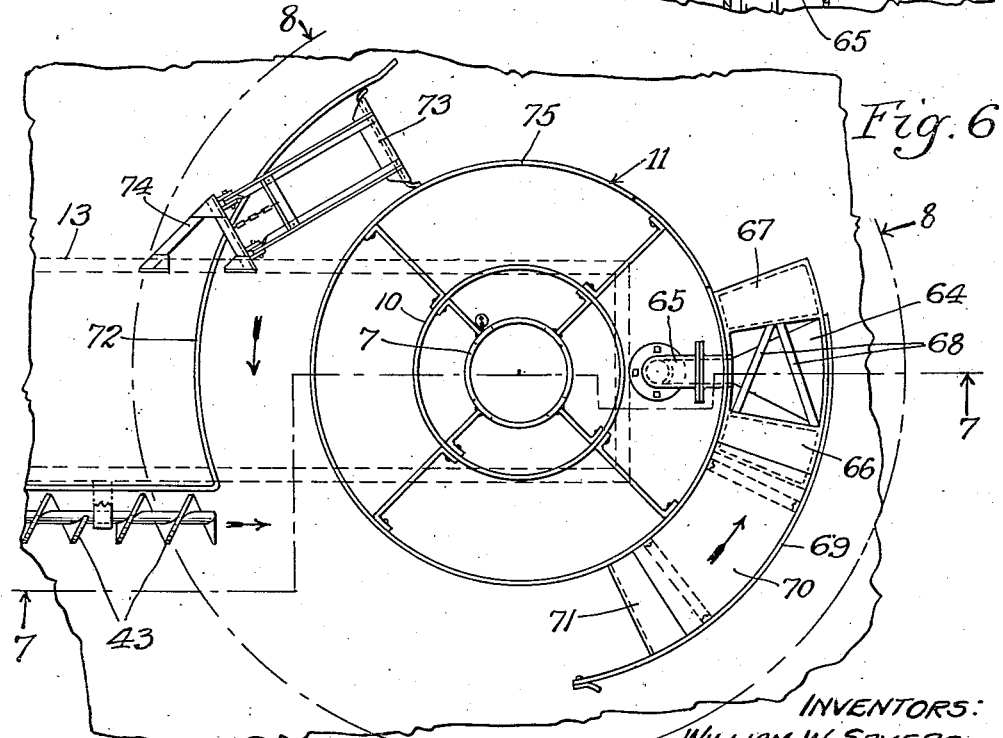
Figure 6 is a detail plan view of a modified form of scum discharge apparatus.

In the modified form shown in Figures 6, 7 and 8, the scum instead of being discharged at the periphery of the tank is discharged at its center. The scum screw 43, in this case conveys in the opposite direction. The scum hopper 64 is mounted on the perforate baffle 11. It discharges through a scum pipe 65, which extends out beneath the floor of the tank. Associated with the hopper 64 are the ramps 66, and 67, tracks 68, the curved outer wall 69, the floor 70, and the floor ramp 71, all combining to form a scum trough. The movable scum chamber in this case is defined between the curved blade 72, and the perforate baffle 11. The scum scraper 73 is hinged on a frame 74, on the bridge and is located between the unperforated portion 75, of the baffle 11, and the blade 72. As the bridge rotates scum is fed into the movable scum chamber by the screw. The scraper 73, in cooperation with the blade 72, and 69, segregates the scum and forces it and the accompanying water along the scum trough up the ramp 71, across the floor 70, up the ramp 66, into the hopper 64, whence it is discharged through the pipe 65.

Only the upper portion of the baffle needs to be imperforate because this scumming action is located almost entirely at the surface of the liquid. The scum scraper penetrates only far enough to insure that the scum will not float under it and this requires a very slight penetration, owing to the very low speed at which the scraper travels. The speed is much lower when the scraper is near the center of the tank than when it is at the periphery. The presence of the scum discharge mechanism at the center of the tank does not interfere with the distribution of the liquid to be treated.

While the scum which has come within the zone of influence of the screw conveyor has little if any chance to escape until it is discharged into the scum chamber in line with the scum hopper, there is a possibility of the scum escaping from the movable chamber especially when as in the case of sedimentation tanks of very large diameter, this chamber is at it often is many feet wide. Under these circumstances we may provide supported on a bracket 80, from the bridge 13, blades 81, 82 in approximate alignment with the end of the conveyor screw 43, and extending forwardly from the screw. These blades are immersed in the liquid and they carry between them a hinged baffle 83, immersed in the liquid and associated with a stop 84, which prevents forward rotation of the baffle but leaves it free to swing rearwardly so that as the bridge goes forward, the baffle rides up over the scum hopper to leave the way clear for the scum behind it to be forced thereinto.

While we have illustrated our scum skimming invention as being supported on a bridge which rotates in a tank about a center of rotation and carries a flight conveyor sludge collector, it will be obvious that the bridge might support any other suitable type of sludge collecting means, such as fixed blades or rakes or the like or that the bridge might be mounted for movement along parallel instead of curved lines. Moreover there might be substituted for the bridge above the surface of the liquid any suitable support beneath the liquid surface, without departing from the spirit of our invention.

We have emphasized the effectiveness of our scum collecting mechanism in connection with varying wind conditions but this has been done merely to bring out the fact that our scum collector is the only one of which we have any knowledge which is immune to adverse wind conditions, adverse wind conditions being disastrous to satisfactory working of other types heretofore on the market. The screw may be partly or entirely submerged.

We have emphasized the fact that our scum collector is especially adapted for use with tanks where the skimmer extends only half way across the tank as is common in connection with round tanks but obviously it will work equally well if it extends clear across the tank.

We have shown the skimmer, the bridge and the sludge collecting mechanism all driven in unison. This is preferable from a design point of view but they might of course be separately driven or any two of them driven together with the other separate.

An important feature of our invention is that it makes it possible to remove the scum at the center of the tank at a point remote from its walls. Other scum collecting apparatuses on the market and familiar to the industry lack this important feature. This is important because it frequently happens that the major portion of the scum originates at the center of the tank or at a point remote from the wall of the tank where the liquid first enters. Under these circumstances, the scum is discharged from the tank at a point adjacent its point of origin, thereby increasing the effectiveness of the entire operation. Moreover, the lower linear speeds through the liquid, of the scum collecting mechanism, adjacent the point of discharge, in the central discharge type, is an appreciable advantage tending to reduce the danger of agitation because when the discharge is at the outer periphery the linear speeds are of necessity higher and there is an increased danger of agitating the liquid and churning the scum back into the liquid at a point where it may be entrained with the effluent.

We claim:

1. Means for collecting scum from the surface of a tank which consists in a backboard mounted for movement across the surface of the tank, means for moving scum along the backboard parallel therewith, means for concentrating the scum beyond the end of the backboard and means for raising the concentrated scum above the level of the liquid in the tank and discharging it, the scum collecting means comprising a rotary screw conveyor, the flights thereof being partially immersed in the liquid of the tank.

2. A scum skimmer for settling tanks and the like including a support, a screw conveyor so mounted on the support that part of the screw projects above the liquid level, means for propelling the support and the screw across the surface of the liquid, means for rotating the screw, a back board parallel with and behind the axis of the screw as the screw moves forwardly across the liquid.

3. A scum skimmer for settling tanks and the like including a support, a screw conveyor so mounted on the support that part of the screw projects above the liquid level, means for propelling the support and the screw across the surface of the liquid, means for rotating the screw, a backboard parallel with and behind the axis of the screw as the screw moves forwardly across the surface of the liquid, a scum chamber extending rearwardly from the discharge end of the screw and mounted for movement with it.

4. A scum skimmer for settling tanks and the like including a support, a screw conveyor so mounted on the support that part of the screw projects above the liquid level, means for propelling the support and the screw across the surface of the liquid, means for rotating the screw, a backboard parallel with and behind the axis of the screw as the screw moves forwardly across the surface of the liquid, a scum chamber extending rearwardly from the discharge end of the screw and mounted for movement with it, the discharge end of the screw being adjacent the scum chamber.

5. A scum skimmer for settling tanks and the like including a support, a screw conveyor so mounted on the support that part of the screw projects above the liquid level, means for propelling the support and the screw across the surface of the liquid, means for rotating the screw, a backboard parallel with and behind the axis of the screw as the screw moves forwardly across the surface of the liquid, a scum chamber extending rearwardly from the discharge end of the screw and mounted for movement with it, the discharge end of the screw being adjacent to the scum chamber and a closure for the front of the chamber.

6. A scum skimmer comprising a scum conveyor screw partially immersed in the liquid of the tank, means for bodily displacing it, means for rotating it to cause it to convey the scum along a path intersecting the line of bodily displacement, a scum chamber at the end of the screw into which the screw is adapted to discharge scum, the chamber being mounted for movement with the screw, a scum hopper, means for moving the scum chamber toward and discharging it into the scum hopper including a scum trough comprising a floor located beneath the level of the liquid, a ramp leading from the floor to the scum hopper, and a scum scraper associated with the scum chamber adapted to propel scum and water along the floor and up the ramp into the scum hopper.

7. Means for collecting scum from the surface of a tank including a movable scum collecting member, means for imparting bodily movement to the member simultaneously in two different directions to collect and concentrate sludge, a concentration trap movable with the scum collecting means, a scum discharge hopper and a scum trough located in the path of the scum trap, the trap and associated parts being adapted to force scum into the trough and therefrom into the hopper for discharge.

8. In combination, a sedimentation tank, a scum hopper, the lip of which is located above the level of liquid in the tank, a scum trough including a ramp extending from beneath the liquid level upwardly to the lip of the hopper, a floor below the level of the liquid in continuation of the ramp, a trough lip, trough walls on both sides of the floor and the ramp, projecting above and below the level of the liquid, a movable scum chamber including a wall in general alignment with one of the trough walls, and a scum scraper substantially perpendicular to said wall, means for moving the movable wall and the scum scraper toward and along the trough so that as the scum scraper travels along the floor and the ramp, the wall moves along the outside of the trough wall whereby the scraper forces scum and liquid along the trough into the scum hopper.

9. In a scum collector, a scum trough including a pair of fixed walls in general parallelism, a scum hopper between the fixed walls, a floor between the piped walls below the liquid level, a ramp leading upwardly from the floor to the hopper, a movable wall, a scum scraper movable with the movable wall, means for moving the wall and the scraper toward the hopper and for guiding the wall and the scraper so that the movable wall travels in immediate juxtaposition to one of the fixed walls included in the scum trough, closing means between the scraper and the walls and between the fixed and movable walls, the scraper and movable wall being adapted to cooperate with the trough to limit escape of scum as the scraper moves toward the trough and being so positioned and of such relative sizes that the scraper extends substantially clear across the trough to substantially prevent escape of scum from the trough as the scraper moves the scum and liquid therealong into the scum hopper.

10. In combination, a circular sedimentation tank, a support mounted for rotation about an axis adjacent the center of the tank, one end of the support being adapted to sweep along the periphery thereof, means for rotating the support about its axis, a scum backboard extending into the liquid, carried by the support, extending radially with respect to the tank, a rotary screw scum conveyor in front of the scum backboard, the screw and backboard terminating short of the outer periphery of the tank, a scum chamber mounted on the support, adapted to move therewith and to convey the scum received from the conveyor along the surface of the liquid in the tank, a scum hopper adjacent the periphery of the tank in the path of the scum chamber and adapted to receive the scum therefrom, a scum trough extending from the scum hopper toward the approaching support, including a floor below the level of the liquid in the tank, a scum scraper forming part of the scum chamber, adapted to travel along the floor, entrap water and scum and discharge them into the scum hopper.

11. In combination, a circular sedimentation tank, a support mounted for rotation about an axis adjacent the center of the tank, one end of the support being adapted to sweep along the periphery thereof, means for rotating the support about its axis, a scum backboard extending into the liquid, carried by the support, radially displaced with respect to the tank, a rotary screw scum conveyor whose axis of rotation is generally parallel with the surface of the liquid in the tank in front of the scum backboard, the screw and backboard terminating short of the outer periphery of the tank, a scum chamber mounted on the support, adapted to move therewith and adapted to receive scum from the backboard and conveyor and to convey the scum thus received along the surface of the liquid in the tank, the screw being partially above and partially below the surface of the liquid.

12. In combination a liquid containing tank, a scum collecting blade immersed in and mounted for movement across the surface of the liquid, scum concentrating means located in front of and movable with the blade for propelling scum laterally along the blade and for holding the concentrated scum against the blade, and a chamber extending rearwardly of the blade and communicating with the zone between the blade and the concentrating means.

13. In combination a liquid containing tank, scum collecting and concentrating means movable across and adapted to propel scum across the surface of the liquid, a chamber movable with the collecting and concentrating means, adapted to receive the scum therefrom, a scum trough in the path of the chamber having a floor below and side walls extending upwardly therefrom above the level of the liquid, a scum discharge passage extending from said trough beyond the periphery of the tank, a scraper forming a part of the chamber wall of such size and so mounted as to penetrate within and close the trough and to travel therealong to force entrapped scum outwardly through the passage.

WILLIAM W. SAYERS.
MARCUS B. TARK.
HAROLD F. WATSON.